(12) United States Patent
Hong et al.

(10) Patent No.: US 9,600,591 B2
(45) Date of Patent: Mar. 21, 2017

(54) METHOD AND APPARATUS FOR URL ADDRESS SEARCH IN URL LIST

(71) Applicant: Samsung Electronics Co., Ltd, Gyeonggi-do (KR)

(72) Inventors: Junseok Hong, Gyeonggi-do (KR); Sangig Rho, Seoul (KR); Hocheol Lee, Gyeonggi-do (KR); Kyuho Cho, Gyeonggi-do (KR); Jaejin Kim, Gyeonggi-do (KR); Jonghun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 611 days.

(21) Appl. No.: 13/998,070

(22) Filed: Sep. 27, 2013

(65) Prior Publication Data

US 2014/0089344 A1    Mar. 27, 2014

(30) Foreign Application Priority Data

Sep. 25, 2012    (KR) .................. 10-2012-0106209

(51) Int. Cl.
*G06F 17/30*    (2006.01)

(52) U.S. Cl.
CPC .. *G06F 17/30887* (2013.01); *G06F 17/30743* (2013.01); *G06F 17/30749* (2013.01); *G06F 17/30005* (2013.01)

(58) Field of Classification Search
CPC ......... G06F 17/30887; G06F 17/30864; G06F 17/30867; G06F 17/30743; G06F 17/30749; G06F 17/30758; G06F 17/30005; G06F 17/30896; G06F 17/30899

USPC ................................................ 707/769, 772
See application file for complete search history.

(56) References Cited

U.S. PATENT DOCUMENTS

| | | | | |
|---|---|---|---|---|
| 6,092,100 A * | 7/2000 | Berstis | .............. | G06F 17/30887 707/769 |
| 6,580,870 B1 * | 6/2003 | Kanazawa | .............. | G11B 27/34 386/240 |
| 6,999,444 B1 * | 2/2006 | Nitta | .................. | G06F 17/30876 370/338 |
| 7,194,552 B1 * | 3/2007 | Schneider | ........... | H04L 61/3015 709/217 |
| 7,383,299 B1 * | 6/2008 | Hailpern | ........... | G06F 17/30867 707/713 |
| 7,529,746 B2 * | 5/2009 | Ichiriu | .............. | G06F 17/30985 707/749 |
| 7,624,105 B2 * | 11/2009 | Ichiriu | .............. | G06F 17/30864 707/669 |
| 7,644,080 B2 * | 1/2010 | Mammen | .......... | G06F 17/30516 707/713 |

(Continued)

*Primary Examiner* — Shahid Alam (57) ABSTRACT

A URL search apparatus is configured to perform a method for URL address search in a URL list. The URL search apparatus maintains a URL list, and the method for Uniform Resource Locator (URL) address search includes receiving a connection request containing URL address information from a user; identifying tables that are generated according to characters constituting URL address information in the URL list and lengths of character strings serving as URL address information in the URL list; and performing a URL search by checking whether the URL address information contained in the connection request is present in the URL list on the basis of the identified tables.

20 Claims, 10 Drawing Sheets

(56) References Cited

U.S. PATENT DOCUMENTS

| | | | | |
|---|---|---|---|---|
| 7,827,254 | B1* | 11/2010 | Nevill-Manning | G06F 17/30864 |
| | | | | 709/217 |
| 8,949,251 | B2* | 2/2015 | Thomas ............ | G06F 17/30887 |
| | | | | 707/749 |
| 2004/0019697 | A1* | 1/2004 | Rose ................. | G06F 17/30887 |
| | | | | 709/245 |
| 2006/0031205 | A1* | 2/2006 | Perkins ............ | G06F 17/30887 |
| | | | | 707/769 |
| 2008/0071765 | A1* | 3/2008 | Ichiriu ............. | G06F 17/30985 |
| | | | | 707/723 |
| 2008/0071781 | A1* | 3/2008 | Ninan ............... | G06F 17/30495 |
| | | | | 707/749 |
| 2012/0136764 | A1* | 5/2012 | Miller ................ | G06Q 40/123 |
| | | | | 705/31 |
| 2012/0158775 | A1* | 6/2012 | Choi ................. | G06F 17/30997 |
| | | | | 707/769 |

* cited by examiner

[ URL List ]

| URL Index | URL ADDRESS INFORMATION |
|---|---|
| 1 | www.samsung.com |
| 2 | www.google.com/* |
| 3 | *.nate.com |
| 4 | www.naver.com/index.html_id=????? |
| 5 | ???.google.com/* |

METHOD AND APPARATUS FOR URL ADDRESS SEARCH IN URL LIST

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Sep. 25, 2012, and assigned Serial No. 10-2012-0106209, the entire disclosure of which is hereby incorporated by reference.

TECHNICAL FIELD

The present disclosure relates to a communication system. More particularly, the present disclosure relates to a method and apparatus that search for a URL address in a URL list managed by a core node in a communication system.

BACKGROUND

Recent advances in mobile communication have enabled rapid popularization of smartphones. Accordingly, mobile communication network traffic, similar in characteristics to that of existing wired Internet Protocol (IP) networks, has rapidly increased. Hyper Text Transfer Protocol (HTTP) traffic used in web surfing includes a Uniform Resource Locator (URL) address indicating an HTTP packet destination.

Service providers demand functions that enable access permission or blocking, application of different billing plans, and the like, on the basis of URL addresses. In an A-EPC core network system supporting data rates of 100 Gbps, when search time refers to a duration used to determine whether a user-requested URL is present in a URL list stored in the core network system, a fast search algorithm with a search time measured in CPU cycles is used rather than an existing string search algorithm employing a search time measured in milliseconds or seconds.

Hash algorithms are mainly used to search for character strings without wildcard characters. A URL list maintained by a core network system may need to support wildcard characters (e.g., "*.samsung.com") because it is difficult to individually manage numerous URL addresses.

However, hash algorithms, which are most efficient for string matching, may not be directly used to search for character strings containing a wildcard. In addition, string search algorithms capable of handling wildcards may be too slow to be usable in core networks requiring fast processing.

SUMMARY

To address the above-discussed deficiencies of the prior art, it is a primary object to provide a method and apparatus that can rapidly search for a URL address from a URL list managed by a core node in a communication system.

More specifically, another aspect of the present disclosure is to provide a method and apparatus that, in response to an HTTP request containing URL address information from a user, search for a URL address on the basis of tables generated according to properties of characters constituting the URL address information and lengths of character strings.

In accordance with an aspect of the present disclosure, a method for Uniform Resource Locator (URL) address search in a URL search apparatus maintaining a URL list is provided. The method includes receiving a connection request containing URL address information from a user, identifying tables that are generated according to characters constituting URL address information in the URL list and lengths of character strings serving as URL address information in the URL list, and performing a URL search by checking whether the URL address information contained in the connection request is present in the URL list on the basis of the identified tables.

In accordance with another aspect of the present disclosure, an apparatus for Uniform Resource Locator (URL) address search is provided. The apparatus includes an interface unit configured to receive a connection request containing URL address information from a user, a storage unit configured to store a URL list of one or more URL addresses, and tables that are generated according to characters constituting URL address information in the URL list and lengths of character strings serving as URL address information in the URL list, and a control unit configured to control a URL search for checking whether the URL address information contained in the connection request is present in the URL list on the basis of the stored tables.

In a feature of the present disclosure, when an HTTP request containing URL address information is received from a user, a URL address search is performed on the basis of tables generated according to characters constituting URL address information of a specific URL list and lengths of character strings serving as a URL address.

Hence, a URL search may be performed sufficiently quickly to be usable in a core network environment.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure.

Those skilled in the art will understand that the principles of the present disclosure may be implemented in any suitably arranged electronic device. Hereinafter, a method and apparatus for URL address search are described in detail as embodiments of the present disclosure with reference to the accompanying drawings. The same reference symbols are used throughout the drawings to refer to the same or like parts. Detailed descriptions of well-known functions and structures incorporated herein may be omitted to avoid obscuring the subject matter of the present disclosure.

In the description, the URL search apparatus of the present disclosure may be a specific node on the core network of a mobile communication system. For example, in a 3rd Generation Partnership Project (3GPP) Long Term Evolution (LTE) system, the URL search apparatus may correspond to the Serving Gateway, the Packet Data Network Gateway, the Mobility Management Entity (MME), or the like.

However, the URL search apparatus is not limited to such nodes, and may correspond to any device performing a search for character strings such as URL addresses.

In the description, a "character" may indicate a smallest unit constituting a URL address, such as a letter of the English alphabet. Multiple characters may constitute a "character string" (or "string"), which may be a meaningful word.

Figure 1:
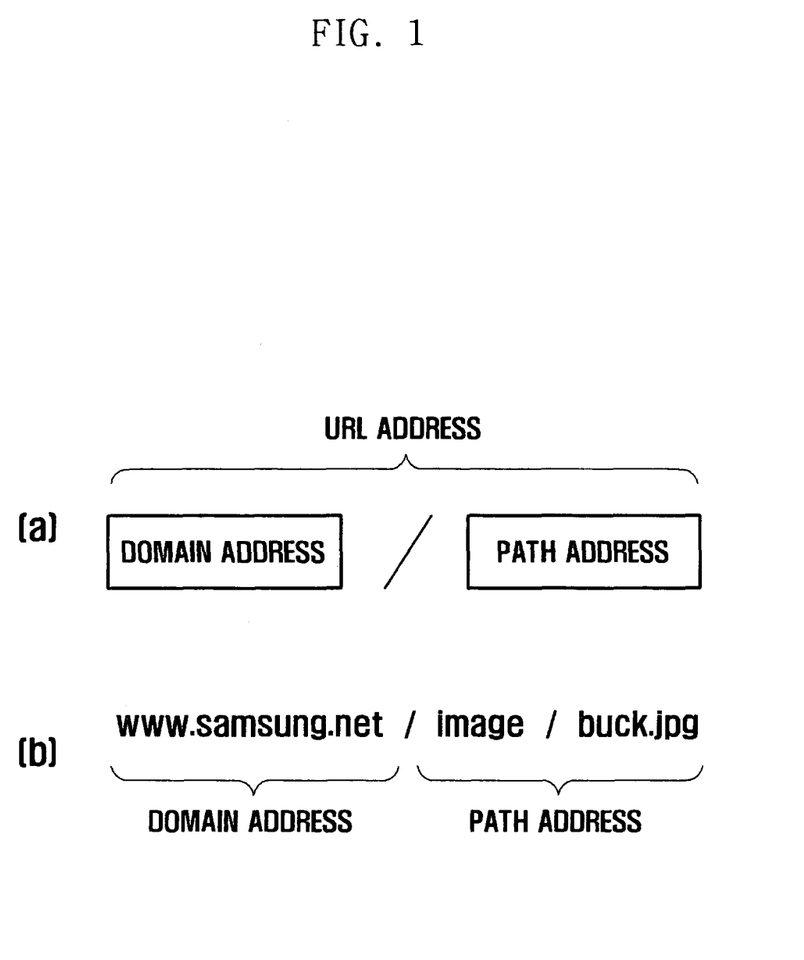
FIG. 1 illustrates a structure of a URL address according to an embodiment of the present disclosure.

FIG. 1 illustrates a structure of a URL address according to an embodiment of the present disclosure.

As shown in part (a) of FIG. 1, a URL address according to an embodiment of the present disclosure includes a domain address and a path address.

Part (b) of FIG. 1 illustrates an example of a URL address.

Specifically, in a URL address "www.samsung.net/image/back.jpg", the former part "www.samsung.net" (before the first '/') is a domain address and the latter part "image/back.jpg" (after the first '/') is a path address.

In the present disclosure, for efficient URL address search, a URL address is separated into a domain address and a path address, and tables are created respectively for the domain address and path address. This will be described in detail later.

In one embodiment, search for character strings containing a wildcard is supported. A wildcard is a symbol used to designate multiple characters or files at once. For example, a first wildcard is a character '*', and a second wildcard is a character '?'. The first wildcard '*' is a special character representing one or more other characters, and the second wildcard '?' is a special character representing one other character.

In one embodiment, the first wildcard character is assumed to be usable only at the foremost part of a domain address or at the rearmost part of a path address.

Figure 2:
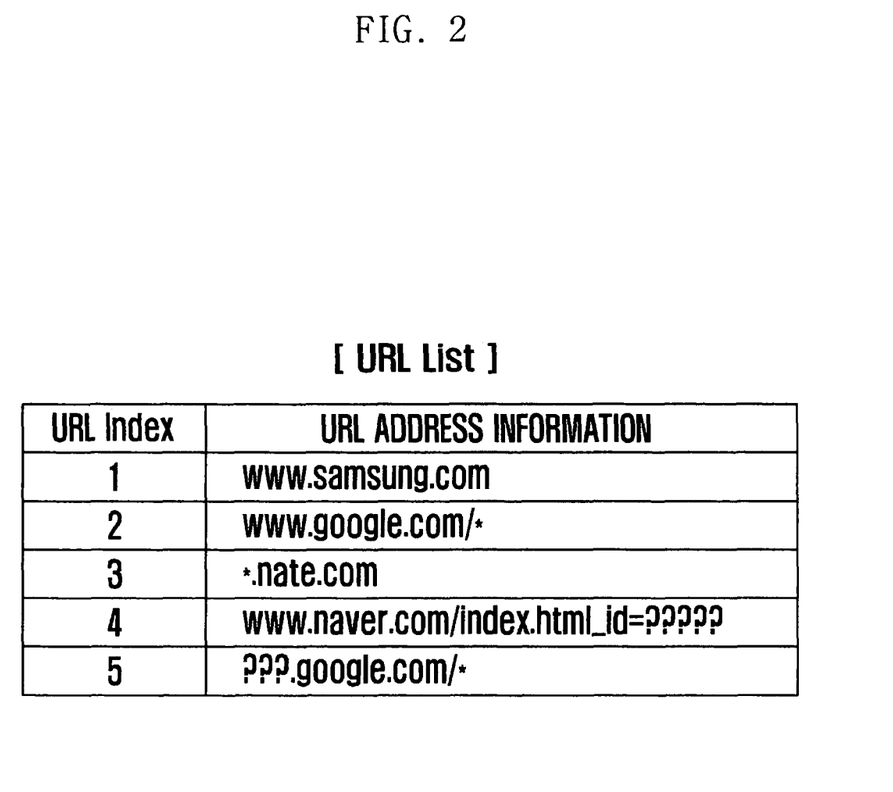
FIG. 2 illustrates a URL list stored in a URL search apparatus according to an embodiment of the present disclosure.

FIG. 2 illustrates a URL list stored in a URL search apparatus according to an embodiment of the present disclosure. As shown, a URL list may include one or more URL addresses.

Referring to FIG. 2, a URL list is composed of URL indexes and associated URL address information. Here, URL address information may be a URL address provided by a service provider wishing to search for or filter the URL address. In the URL list, URL address information may be edited (created, modified, deleted, or the like) according to a request from a service provider.

URL address information associated with URL index 1 is a URL address without a wildcard. URL address information associated with URL index 2 indicates any URL address beginning with "www.google.com". URL address information associated with URL index 3 indicates any URL address containing "nate.com" such as "www.nate.com" or "talk.nate.com".

URL address information associated with URL index 5 indicates any URL address containing three characters before the string "google.com" such as "map.google.com/index.html". URL address information associated with URL index 5 is an example of using different types of wildcards ('*', '?') in one piece of URL address information.

Next, a description will be given of creation of first and second tables for a URL list according to an embodiment of the present disclosure.

Using a stored URL list, the URL search apparatus of the present disclosure creates a first table (character identification table) and a second table (end identification table) respectively for a domain address and path address of URL address information associated with each URL index. In other words, the URL search apparatus creates a first table and a second table for a domain address and creates a first table and a second table for a path address.

The first table is used to designate an index to a character at each position (character identification index) in a character string serving as a domain address (or path address). The second table is used to designate an index to a position of the last character (end identification index) in a character string serving as a domain address (or path address).

During URL address search, the first table is used to determine whether each character constituting a URL address to be searched is present in the URL list; and the second table is used to determine whether the length of a URL address to be searched is equal to that of a corresponding URL address in the URL list.

The first table and second table are described in detail with reference to FIGS. 3 to 6.

<Creation of First Domain Table for Domain Address>

Figure 3:
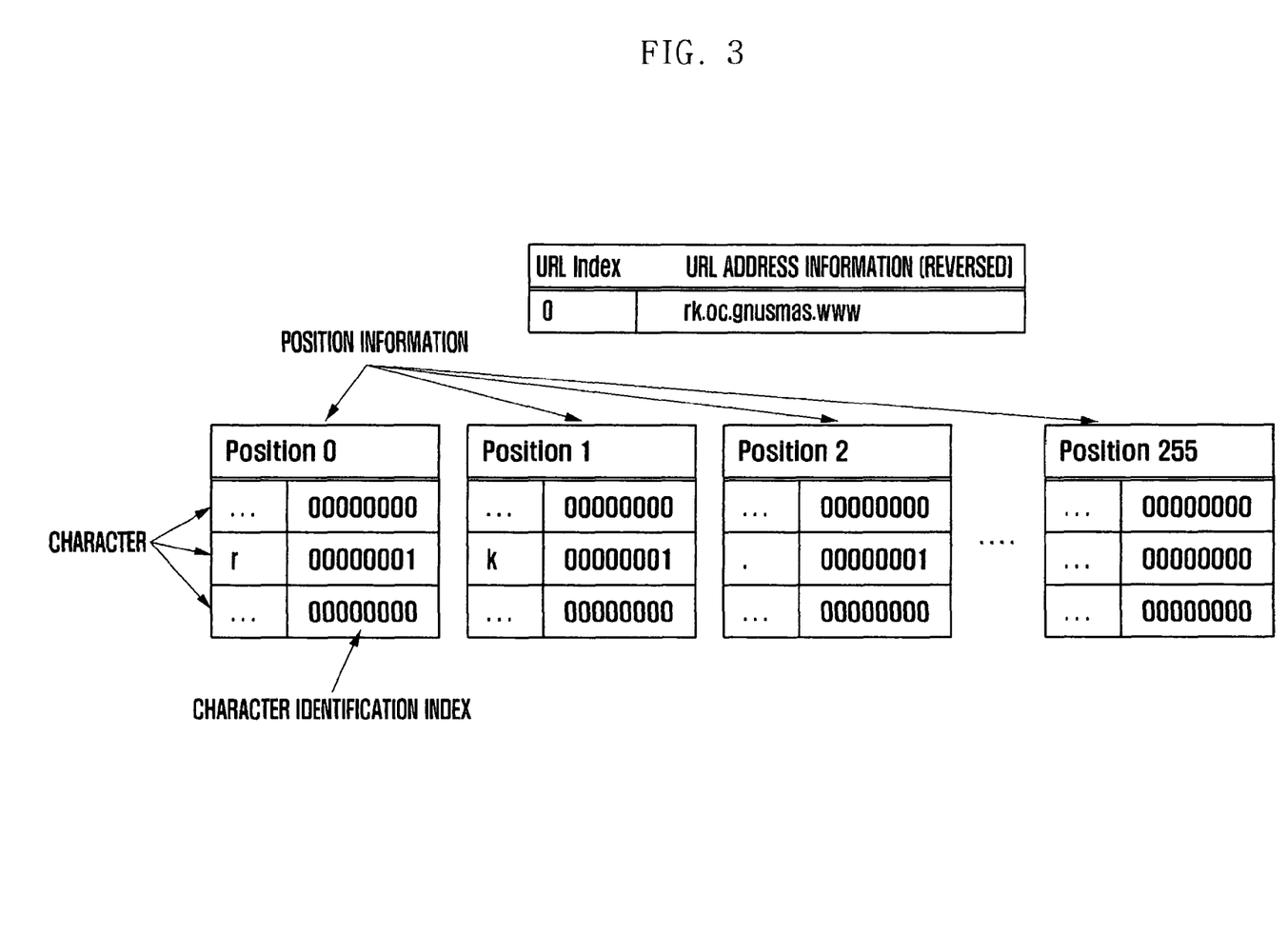
FIG. 3 is an illustration of a first domain table created for a domain address according to an embodiment of the present disclosure.

FIG. 3 is an illustration of a first domain table created for a domain address according to an embodiment of the present disclosure.

In FIG. 3, it is assumed that the maximum domain address length is 256 characters and a URL list may include up to eight pieces of URL address information. FIG. 3 illustrates a first domain table created for a domain address "www.samsung.co.kr" associated with URL index 0.

First, the URL search apparatus reverses the character string serving as a domain address. For example, "www.samsung.co.kr" is reversed to "rk.oc.gnusmas.www".

For the reversed domain address, the first character 'r' is assigned to position 0, the second character 'k' is assigned to position 1, and the remaining characters are assigned respectively to corresponding positions. As the maximum length of a domain address is assumed to be 256 characters, the position number may be assigned up to 255 (position 255).

For each position, all characters usable in the position (a-z, 0-9 and special characters allowed in a URL) are listed; and for each character, a character identification index is set to indicate usage of the character. The character identification index is a bit pattern, whose number of bits corresponds to the number of entries in the URL list (i.e., the number of URL indexes).

In FIG. 3, as the URL list is assumed to have up to eight entries, each character identification index is composed of 8 bits.

Here, it is assumed that the least significant bit (LSB) of the character identification index corresponds to URL index 0 and the most significant bit (MSB) thereof corresponds to URL index 7.

Describing creation of the first domain table for a domain address in further detail, the 0-th character in the reversed string "rk.oc.gnusmas.www" is 'r' and corresponds to the 0-th position (position 0). For the character 'r' at the 0-th position, the LSB of the character identification index is set to 1 (as URL index is 0). That is, the character identification index for the character 'r' at the 0-th position is set to "00000001".

Next, the 1st character in the reversed string "rk.oc.gnusmas.www" is 'k' and corresponds to the 1st position (position 1). For the character 'k' at the 1st position, the LSB of the character identification index is set to 1. That is, the character identification index for the character 'k' at the 1st position is set to "00000001".

Next, the 2nd character in "rk.oc.gnusmas.www" is '.' and corresponds to the 2nd position (position 2). For the character '.' at the 2nd position, the LSB of the character identification index is set to 1. That is, the character identification index for the character '.' at the 2nd position is set to "00000001".

This process is continued until the character identification index for the last character 'w' in the reversed domain address is set.

As 17 characters are present in "rk.oc.gnusmas.www", character identification indexes after position 16 are all set to zero.

Figure 4:
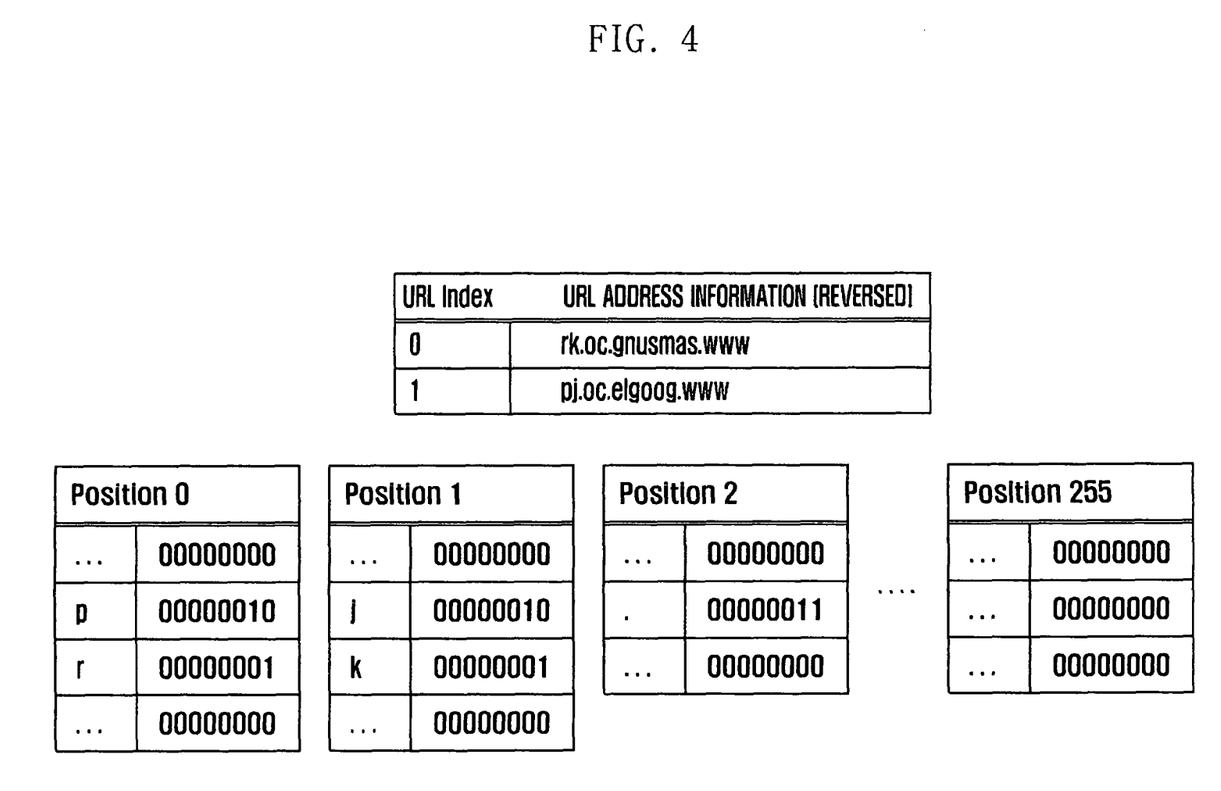
FIG. 4 is another illustration of a first domain table created for a domain address according to an embodiment of the present disclosure.

FIG. 4 is another illustration of a first domain table created for a domain address according to an embodiment of the present disclosure.

FIG. 4 illustrates an update of the first domain table described in FIG. 3 according to an addition of a new domain address.

In FIG. 4, it is assumed that a new domain address "www.google.co.jp" is added to the URL list. As described before, the URL search apparatus reverses the character string serving as a domain address. That is, "www.google.co.jp" is reversed to "pj.oc.elgoog.www".

For the reversed domain address, the first character 'p' is assigned to position 0, the second character 'j' is assigned to position 1, and the remaining characters are assigned respectively to corresponding positions. As the maximum length of a domain address is assumed to be 256 characters, the position number may be assigned up to 255 (position 255) as described in FIG. 3.

In the reversed string "pj.oc.elgoog.www", the 0-th character is 'p' and corresponds to the 0-th position (position 0).

For the character 'p' at the 0-th position, the second LSB of the character identification index is set to 1 (as URL index is 1). That is, the character identification index for the character 'p' at the 0-th position is set to "00000010".

Next, the 1st character in "pj.oc.elgoog.www" is 'j' and corresponds to the 1st position (position 1). For the character 'j' at the 1st position, the second LSB of the character identification index is set to 1. That is, the character identification index for the character 'j' at the 1st position is set to "00000010".

Next, the 2nd character in "pj.oc.elgoog.www" is '.' and corresponds to the 2nd position (position 2). For the character '.' at the 2nd position, the second LSB of the character identification index is set to 1. Here, as '.' is the 2nd character in both "rk.oc.gnusmas.www" (URL index 0) and "pj.oc.elgoog.www" (URL index 1), the character identification index for the character '.' at the 2nd position is set to "00000011".

This process is continued until the character identification index for the last character 'w' in the reversed domain address is set.

Figure 5:
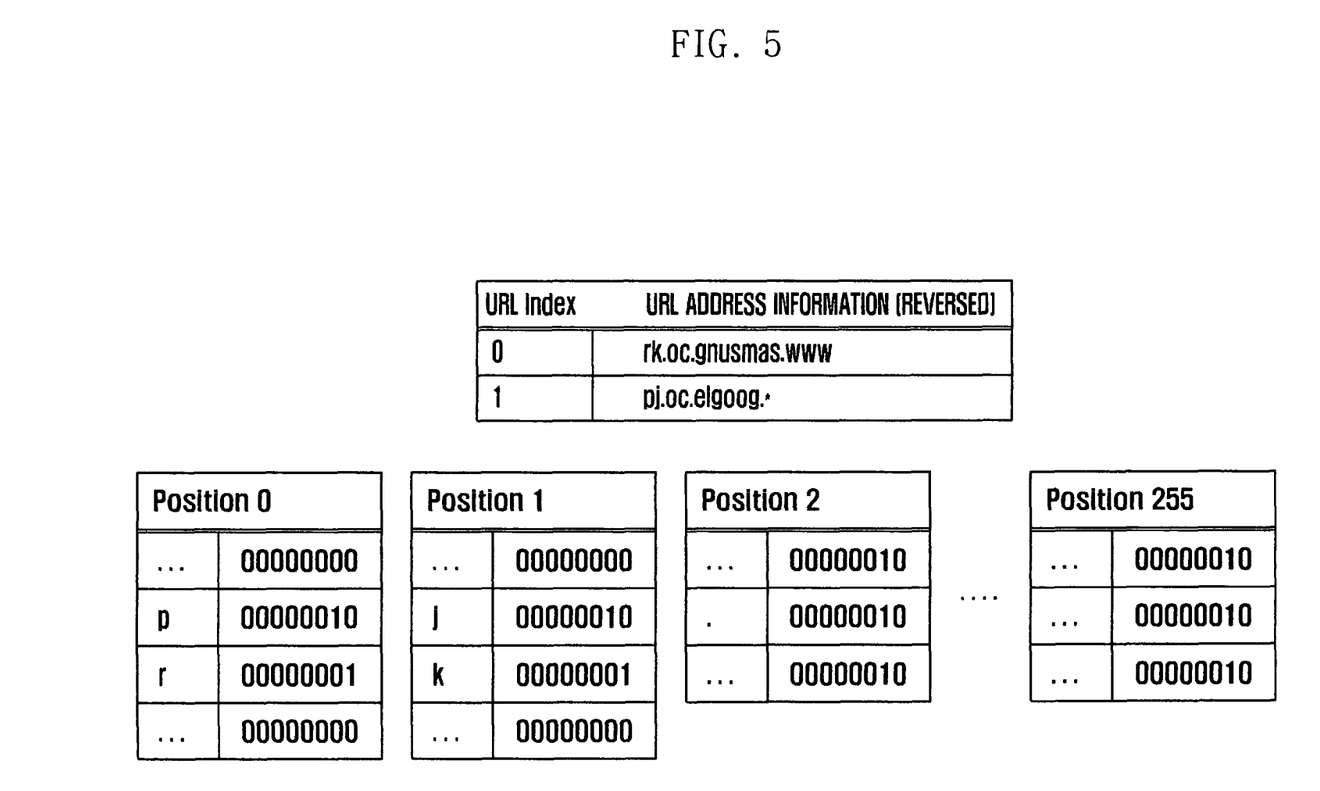
FIG. 5 is another illustration of a first domain table created for a domain address according to an embodiment of the present disclosure.

FIG. 5 is another illustration of a first domain table created for a domain address according to an embodiment of the present disclosure.

FIG. 5 illustrates an update of the first domain table described in FIG. 3 according to an addition of a new domain address (URL index 1) containing a wildcard.

Assume that a new domain address "*.google.co.jp" with URL index 1 is added to the URL list. The URL search apparatus reverses the character string serving as a domain address. That is, "*.google.co.jp" is reversed to "pj.oc.elgoog.*"

In this case, from the 0-th character 'p' to the 12th character '.', the process for generation of the first domain table is the same as that described in FIG. 4, and hence a detailed description thereof is omitted.

In the case of the 13th character '*' (wildcard '*' at position 13), for each character string, the second LSB of, the character identification index is set to 1. That is, at position 13, the character identification index for each string is set to "00000010" (the existing character identification index is bitwise ORed with "00000010"). As the wildcard '*' may match any number of characters, for positions 14 to 255, the character identification index for each string is set to "00000010" (the existing character identification index is bitwise ORed with "00000010").

If the 13th character is a wildcard '?', for each character string, the second LSB of the character identification index is set to 1 (the existing character identification index is bitwise ORed with "00000010"). In contrast to the wildcard '*', character identification indexes for positions 14 to 255 do not change.

<Creation of Second Domain Table for Domain Address>

Figure 6:
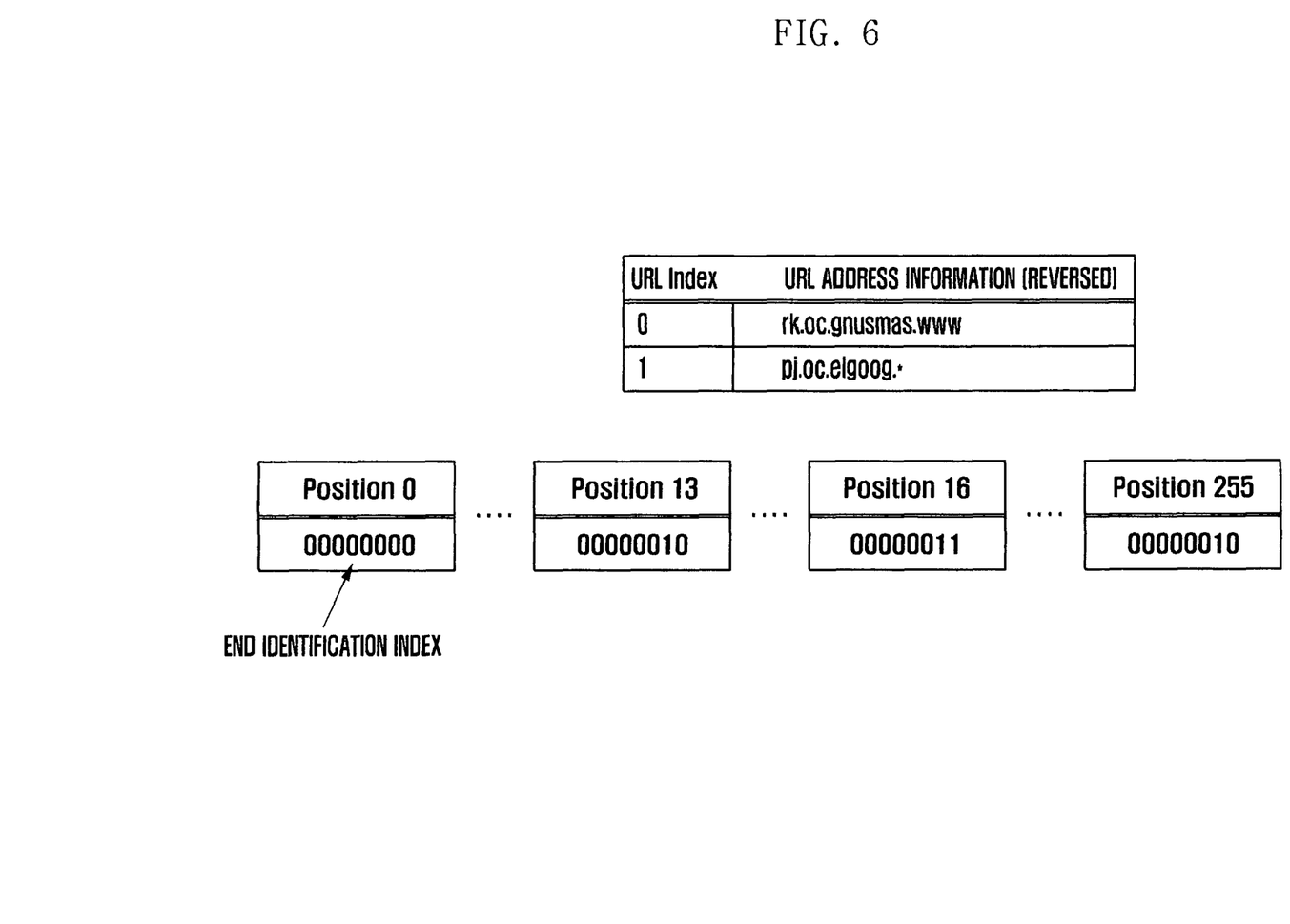
FIG. 6 illustrates generation of a second domain table for a domain address according to an embodiment of the present disclosure.

FIG. 6 illustrates generation of a second domain table for a domain address according to an embodiment of the present disclosure.

As shown in FIG. 6, the second domain table is used to set an end identification index indicating the position of the last character in a character string constituting URL address information.

As the URL list is assumed to have up to eight entries, each end identification index is composed of 8 bits. Here, it is assumed that the LSB of the end identification index corresponds to URL index 0 and the MSB thereof corresponds to URL index 7.

In the URL list of FIG. 6, the string constituting URL address information with URL index 0 ends at position 16. Hence, the LSB of the end identification index at position 16 is set to 1. That is, currently, the end identification index at position 16 is set to "00000001".

Next, the string constituting URL address information with URL index 1 ends at position 13. Hence, the second LSB of the end identification index at position 13 is set to 1. That is, currently, the end identification index at position 13 is set to "00000010".

However, the last character of the URL address information with URL index 1 is a wildcard '*'. In this case, for URL index 1, end identification indexes from the position of the last character to position 255 are set to 1. That is, for each position from 14 to 255, the second LSB of the end identification index is set to 1. Accordingly, the end identification index at position 16 is changed from "00000001" to "00000011".

<Creation of First and Second Path Tables for Path Address>

For a path address, except those where the path address is not reversed, the process of generating a first path table and a second path table is the same as that of a first domain table and a second domain table for a domain address.

Hence, tables for a path address are arranged on a domain address basis, and store indexes corresponding to the actual URL list.

Figure 7:
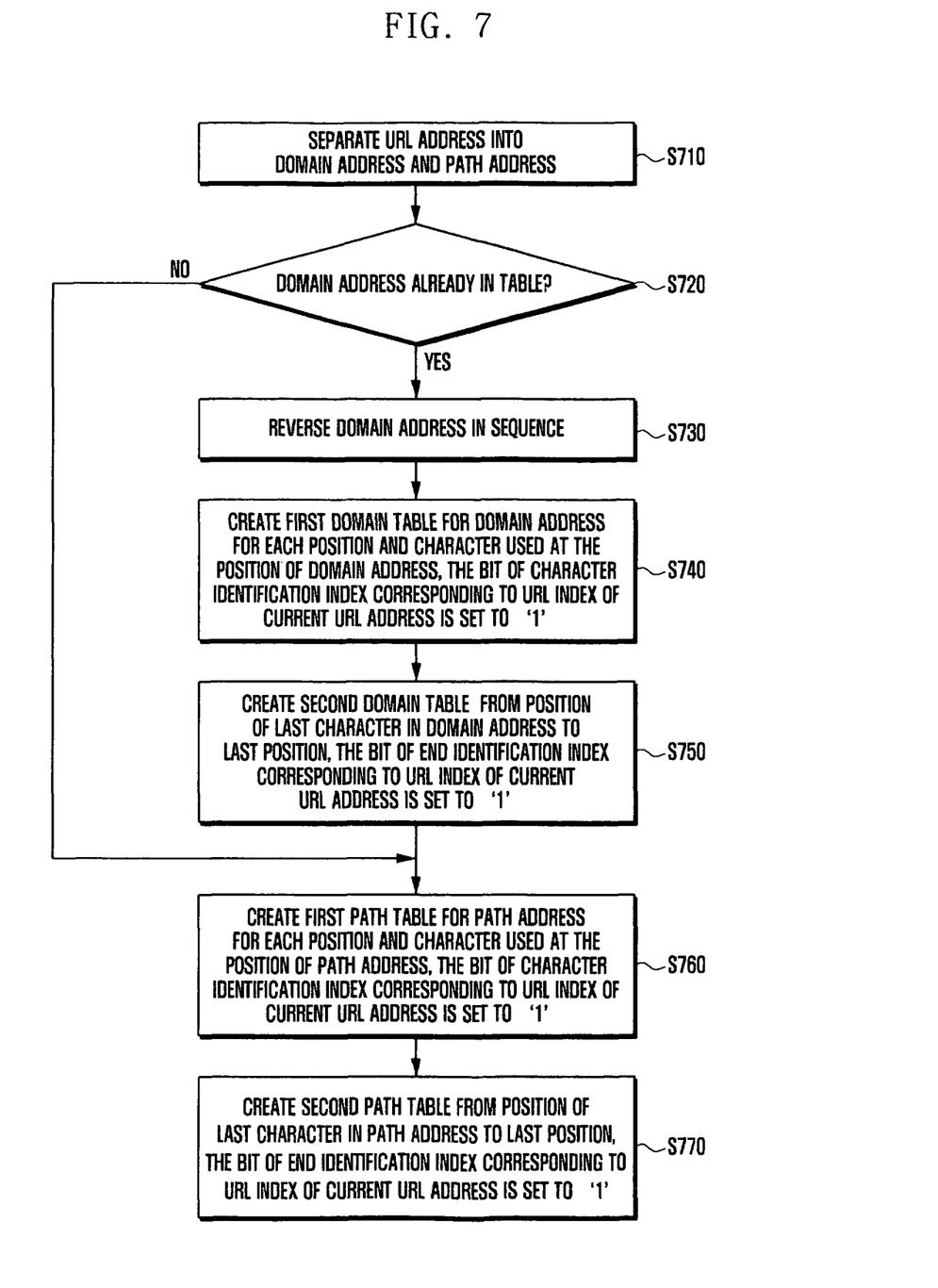
FIG. 7 is a flowchart of a procedure for generating a first domain table and a second domain table, and a first path table and a second path table for a domain address and path address according to an embodiment of the present disclosure.

FIG. 7 is a flowchart of a procedure for generating a first domain table and a second domain table, and a first path table and a second path table for a domain address and path address according to an embodiment of the present disclosure.

Referring to FIG. 7, at operation S710, the URL search apparatus separates a URL address of the URL list into a domain address and a path address. At operation S720, the URL search apparatus checks whether the domain address is already present in a first domain table. If the domain address is already present in the first domain table, the URL search apparatus proceeds to operation S760 to create tables for the path address. If the domain address is not present in the first domain table, the URL search apparatus proceeds to operation S730 to create tables for the domain address.

At operation S730, the URL search apparatus reverses the domain address. At operation S740, the URL search apparatus creates a first domain table for the domain address. For each character position in the reversed domain address, a character identification index is set for the character used at the position.

More specifically, in the first domain table, a number of positions are defined in correspondence with the maximum length of a domain address; for each position, all characters usable at the position are listed; and, for each character, a character identification index whose length in bits corresponds to the number of entries in the URL list is defined.

Here, for each position and character used at the position of the domain address, the bit of the character identification index corresponding to the URL index of the current URL address is set to '1'.

After creation of the first domain table, at operation S750, the URL search apparatus creates a second domain table for the domain address. In the second domain table, for each position, an end identification index is set to indicate a domain address whose last character is placed at the position.

Thereafter, at operation S760, the URL search apparatus creates a first path table for the path address. Except that the path address is not reversed, the process for generating a first path table is the same as that for generating the first domain table as to a domain address, and hence a detailed description thereof is omitted.

At operation S770, the URL search apparatus creates a second path table for the path address. The process of generating a second path table is the same as that of generating the second domain table for a domain address, and hence a detailed description thereof is omitted.

To summarize the procedure for creation of domain tables described in FIGS. 3 to 7, a service provider stores a URL list of URL addresses to filter or search in the URL search apparatus corresponding to a node in the core network. The URL search apparatus creates four tables for URL addresses in the URL list according to the procedure described in FIGS. 3 to 7. Thereafter, when a connection request containing a URL address is received from a user, the URL search apparatus checks whether the URL address contained in the connection request is present in the URL list.

<URL Address Search>

Figure 8:
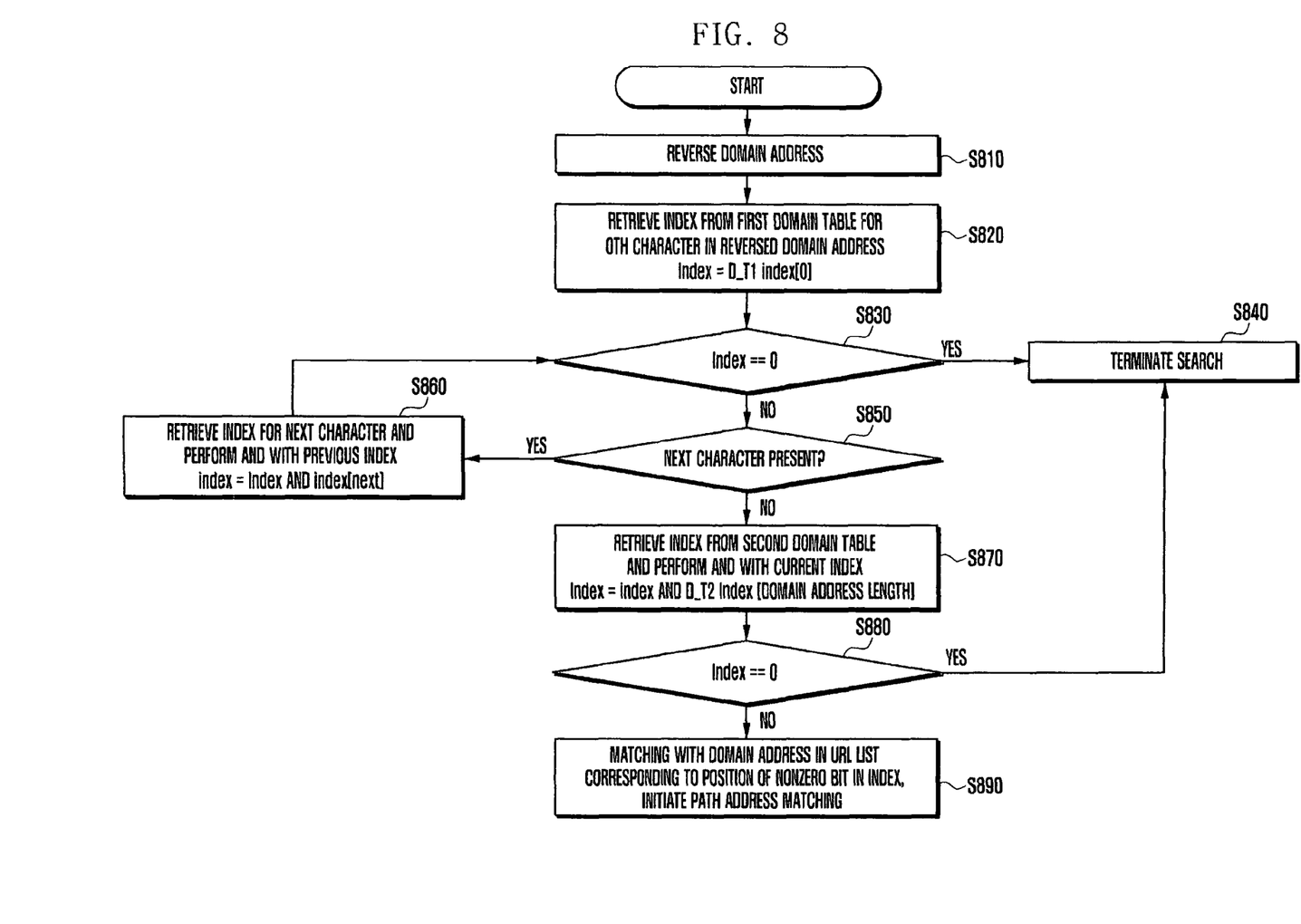
FIG. 8 is a flowchart of a procedure for determining whether a domain address contained in URL address information is present in a URL list according to an embodiment of the present disclosure.
Figure 9:
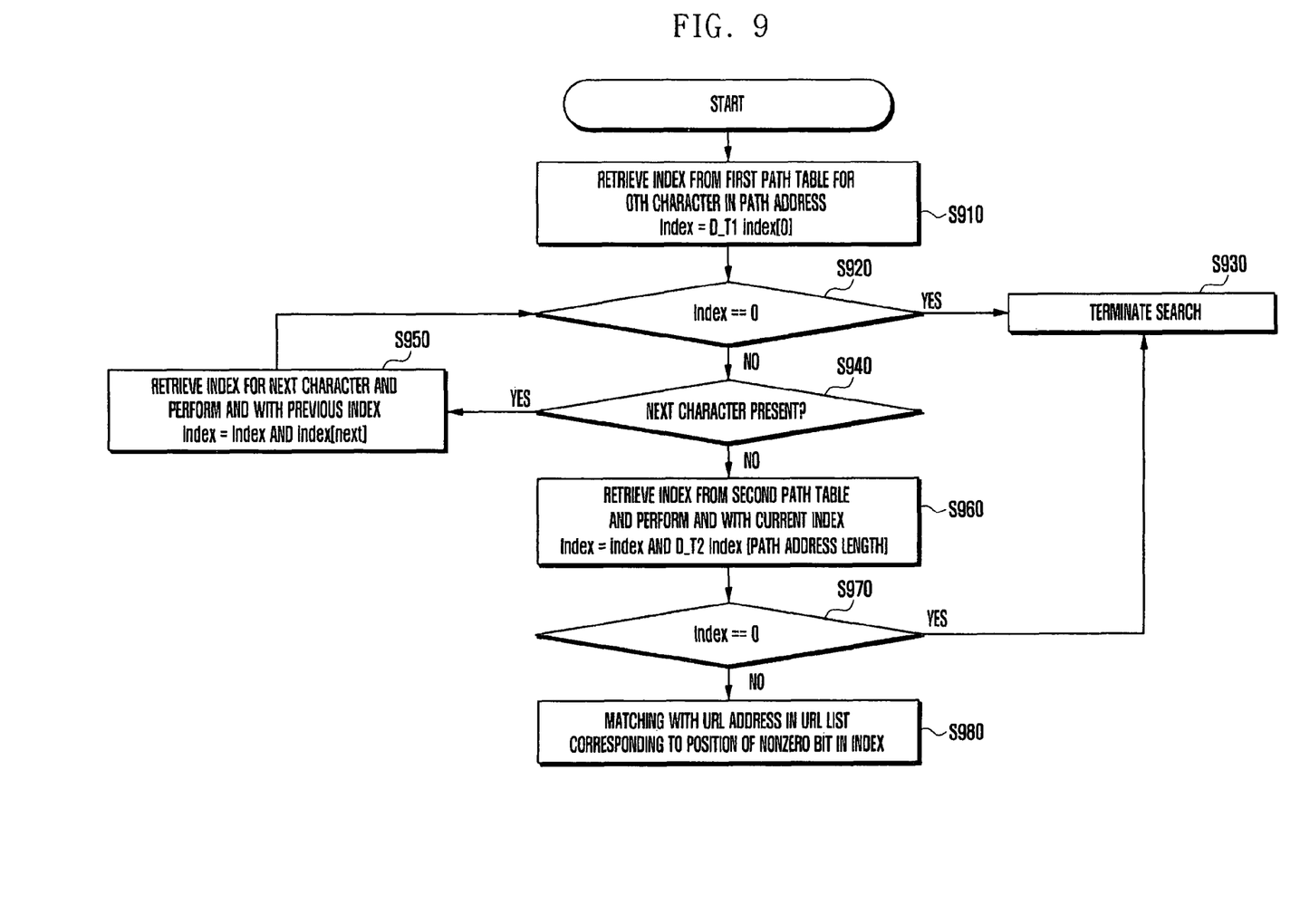
FIG. 9 is a flowchart of a procedure for determining whether a path address contained in URL address information is present in a URL list according to an embodiment of the present disclosure.

Next, a description is given of a search scheme used by the URL search apparatus to check whether a URL address contained in a user connection request is present in the URL list with reference to FIGS. 8 and 9.

FIG. 8 is a flowchart of a procedure for determining whether a domain address contained in URL address information is present in a URL list according to an embodiment of the present disclosure.

For the purpose of description, assume that "www.samsung.co.kr" is the final destination of an HTTP packet contained in a user connection request.

At operation S810, the URL search apparatus reverses the domain address. That is, "www.samsung.co.kr" is reversed to "rk.oc.gnusmas.www".

At operation S820, the URL search apparatus retrieves a character identification index for the 0-th character (for example, 'r') as the current character in the reversed domain address from the first domain table.

At operation S830, the URL search apparatus checks whether the retrieved character identification index (for example, "00000001") is zero. If the retrieved character identification index is zero, as the current character is not present in the first domain table, the URL search apparatus proceeds to operation S840 to end the search procedure.

If the retrieved character identification index is not zero, the URL search apparatus proceeds to operation S850 at which point it determines whether a next character is present. In this example, the next character is 'k' in the reversed domain address.

If a next character is present, the URL search apparatus proceeds to operation S860 (treating the next character as a new current character).

At operation S860, the URL search apparatus retrieves a character identification index (for example, "00000001") for the current character (for example, 'k') and ANDs the character identification index of the previous character and the character identification index of the current character. After ANDing, at operation S830, the URL search apparatus checks whether the AND result is zero. If the AND result is zero, as the current character is not present in the first domain table, the URL search apparatus proceeds to operation S840 to end the search procedure.

If the AND result is not zero, as the current character is present in the first domain table, the URL search apparatus proceeds to operation S850 at which point it determines whether a next character is present.

If a next character is present in the reversed domain address, the URL search apparatus repeatedly performs operation S860, operation S830 and operation S850.

If a next character is not present, the URL search apparatus proceeds to operation S870 at which point it retrieves an end identification index for the domain address from the second domain table and ANDs the character identification index and the end identification index. At operation S880, the URL search apparatus checks whether the AND result is zero.

If the AND result is zero at operation S880, as the string of a domain address contained in a user HTTP connection request matches in characters with a string of a domain address in the URL list but does not match in length therewith, the URL search apparatus proceeds to operation S840 to end the search procedure.

If the AND operation result is not zero at operation S880, as the string of a domain address contained in a user HTTP connection request matches in characters with a string of a domain address in the URL list and matches in length therewith, the URL search apparatus proceeds to operation S890 to initiate path address matching. In this example, the character identification index "00000001" is ANDed with the end identification index "00000011" (at position 16 in the second domain table), producing a result "00000001".

Hence, the URL search apparatus may determine that "www.samsung.co.kr" is present in the URL list. More specifically, the input domain address is matched with a domain address of the URL list corresponding to the position of a nonzero bit in the final AND operation result.

After domain address matching, the URL search apparatus performs a procedure described in FIG. 9 to check whether a path address is present in the URL list.

<Path Address Search>

FIG. 9 is a flowchart of a procedure for determining whether a path address contained in URL address information is present in a URL list according to an embodiment of the present disclosure.

Although a path address is not contained in the URL address "www.samsung.co.kr" used as an example in FIG. 8, when the final destination of an HTTP packet is addressed by a URL address having a domain address and a path address, the procedure of FIG. 9 will be performed for path address matching.

At operation S910, the URL search apparatus retrieves a character identification index for the 0-th character as the current character in an input path address from the first path table. At operation S920, the URL search apparatus checks whether the retrieved character identification index is zero. If the retrieved character identification index is zero, as the current character is not present in the first path table, the URL search apparatus proceeds to operation S930 to end the search procedure.

If the retrieved character identification index is not zero, the URL search apparatus proceeds to operation S940 at which point it determines whether a next character is present in the input path address. If a next character is present, treating the next character as a new current character, the URL search apparatus proceeds to operation S950 at which point it retrieves a character identification index for the current character from the first path table and ANDS the character identification index of the previous character and the character identification index of the current character.

After ANDing, at operation S920, the URL search apparatus checks whether the AND result is zero. If the AND result is zero, as the current character is not present in the first path table, the URL search apparatus proceeds to operation S930 to end the search procedure.

If the AND result is not zero at operation S920, as the current character is present in the first path table, the URL search apparatus proceeds to operation S940 at which point it determines whether a next character is present.

While a next character is present in the input path address, the URL search apparatus repeatedly performs operation S950, operation S920, and operation S940.

If a next character is not present, the URL search apparatus proceeds to operation S960 at which point it retrieves an end identification index for the input path address from the second path table and performs AND operation on the character identification index and the end identification index. At operation S970, the URL search apparatus checks whether the AND operation result is zero.

If the AND operation result is zero at operation S970, as the string of a path address contained in a user HTTP connection request matches in characters with a string of a path address in the URL list but does not match in length therewith, the URL search apparatus proceeds to operation S930 to end the search procedure.

If the AND result is not zero at operation S970, as the string of a domain address contained in a user HTTP connection request matches in characters with a string of a path address in the URL list and matches in length therewith, the URL search apparatus proceeds to operation S980 at which point it determines that input URL address information is present in the URL list. Specifically, the input URL address is matched with a URL address of the URL list with URL index corresponding to the position of a nonzero bit in the final AND operation result.

Figure 10:
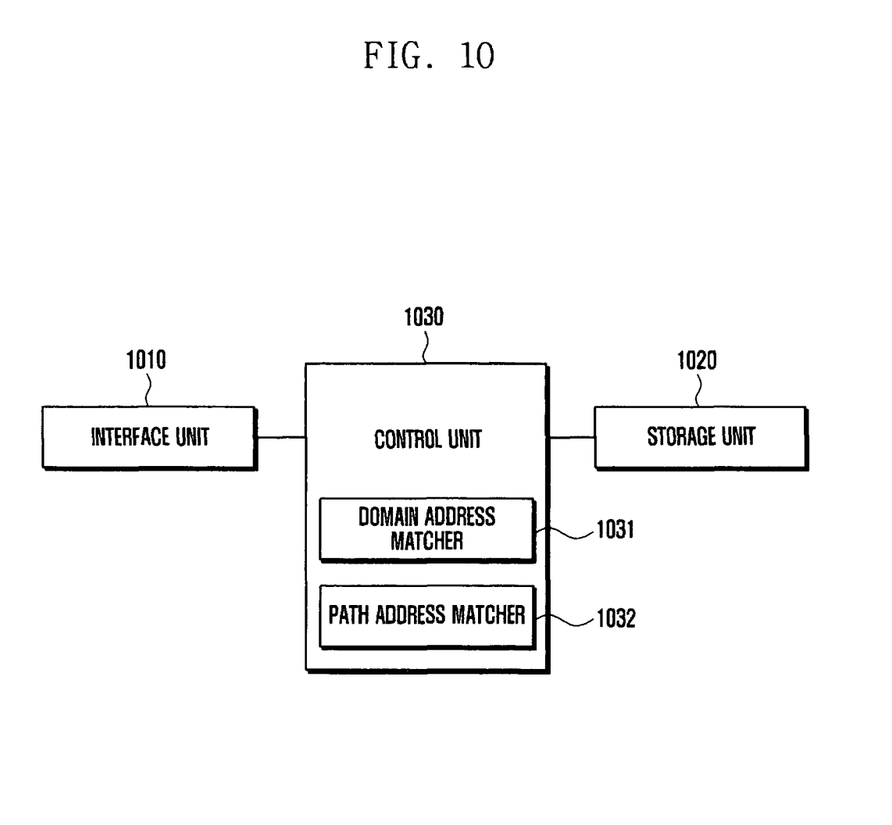
FIG. 10 is a block diagram of a URL search apparatus according to an embodiment of the present disclosure.

FIG. 10 is a block diagram of a URL search apparatus according to an embodiment of the present disclosure. Referring to FIG. 10, the URL search apparatus may include an interface unit 1010, a storage unit 1020, and a control unit 1030.

The interface unit 1010 sends and receives signals to and from upstream and downstream nodes of the URL search apparatus. In particular, the interface unit 1010 may receive a connection request containing URL address information from a user. Here, the connection request may contain HTTP data for web surfing.

The storage unit 1020 may store programs associated with normal operation of the URL search apparatus. In particular, the storage unit 1020 may store a URL list of one or more URL addresses.

The storage unit 1020 may also store tables created according to properties of characters constituting URL address information and lengths of strings constituting the same.

The tables include a first domain table, second domain table, first path table, and second path table.

In the first domain table, character identification indexes are set according to characters constituting a domain address. In the second domain table, end identification indexes are set according to lengths of strings serving as a domain address.

More specifically, in the first domain table, positions are defined so as to correspond to the maximum length of a domain address; for each position, all characters usable in a domain address are listed; and for each character, a character identification index is set as a bit pattern to indicate usage of the character. The number of bits in the character identification index corresponds to the number of entries (i.e., the number of URL addresses) in the URL list.

In the second domain table, an end identification index is set as a bit pattern to indicate the position of the last character in a character string constituting a URL address.

In the first path table, character identification indexes are set according to characters constituting a path address. In the second path table, end identification indexes are set according to lengths of strings serving as a path address.

More specifically, in the first path table, positions are defined so as to correspond to the maximum length of a path address; for each position, all characters usable in a path address are listed; and for each character, a character identification index is set as a bit pattern to indicate usage of the character. The number of bits in the character identification index corresponds to the number of entries (i.e., the number of URL addresses) in the URL list.

In the second path table, an end identification index is set as a bit pattern to indicate the position of the last character in a character string constituting a path address.

The control unit 1030 controls signal flows between internal components of the URL search apparatus so as to search for a URL address in a URL list. The control unit 1030 may create tables according to properties of characters constituting URL address information and lengths of strings constituting the same. The control unit 1030 may check whether URL address information contained in a user connection request is present in the URL list on the basis of the created tables.

More specifically, the control unit 1030 may include a domain address matcher 1031 and a path address matcher 1032.

The domain address matcher 1031 may check whether an input domain address is present in the URL list on the basis of the first domain table specifying character identification indexes according to characters constituting a domain address and the second domain table specifying end identification indexes according to lengths of strings serving as a domain address.

In particular, the domain address matcher 1031 separates input URL address information into a domain address and a path address and reverses the domain address. The domain address matcher 1031 determines whether the domain address is present in the URL list according to results of AND operations between character identification indexes set in the first domain table for characters contained in the domain address.

Upon determining that the domain address is present in the URL list, the domain address matcher 1031 determines whether the length of the domain address is equal to that of a matching domain address in the URL list according to a result of AND operation between the character identification index and the end identification index set in the second domain table. Upon determining that the lengths are equal, the domain address matcher 1031 finally determines that the input domain address is present in the URL list.

The path address matcher 1032 may check whether an input path address is present in the URL list on the basis of the first path table specifying character identification indexes according to characters constituting a path address and the second path table specifying end identification indexes according to lengths of strings serving as a path address.

In particular, the path address matcher 1032 determines whether an input path address is present in the URL list according to results of AND operations between character identification indexes set in the first path table for characters contained in the path address. Upon determining that the path address is present in the URL list, the path address matcher 1032 determines whether the length of the path address is equal to that of a matching path address in the URL list according to a result of AND operation between the character identification index and the end identification index set in the second path table. Upon determining that the lengths are equal, the path address matcher 1032 determines that input URL address information contained in a connection request is present in the URL list.

As described above, when an HTTP request containing URL address information is received from a user, a URL address search is performed on the basis of tables generated according to characters constituting URL address information of a specific URL list and lengths of character strings serving as a URL address. Hence, the URL address search method of the present disclosure may perform the URL search sufficiently rapidly for use in a core network environment.

While the present disclosure has been shown and described with reference to various embodiments thereof, it should be understood by those skilled in the art that many variations and modifications of the method and apparatus described herein will still fall within the spirit and scope of the present disclosure as defined in the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for searching for a Uniform Resource Locator (URL) address in a URL search apparatus that maintains a URL list, the method comprising:
   receiving, at the URL search apparatus, a connection request containing URL address information from a user over a communication network;
   identifying a first table generated according to characters constituting URL address information in the URL list and a second table generated according to lengths of character strings serving as URL address information in the URL list; and
   performing a URL search by checking whether the URL address information contained in the connection request is present in the URL list on the basis of the first table and the second table,
   wherein the first table is used for determining whether the URL address information comprises the characters, and the second table is used for identifying the lengths of the character strings based on a position of a last character of the character strings.

2. The method of claim 1, wherein the URL address information comprises a domain address and a path address.

3. The method of claim 2, wherein the performing of a URL search comprises checking whether a domain address is present in the URL list on the basis of a first domain table specifying character identification indexes according to characters constituting domain address information and a second domain table specifying end identification indexes according to lengths of strings serving as a domain address.

4. The method of claim 3, wherein the first domain table is defined to have positions corresponding to the maximum length of a domain address, to enumerate, for each position, all characters usable in a domain address, and to set, for each character, a character identification index as a bit pattern to indicate usage of the character, and wherein the number of bits in the character identification index corresponds to the number of entries in the URL list.

5. The method of claim 4, wherein the second domain table is defined to set, for each position, an end identification index as a bit pattern to indicate a domain address whose last character is placed at the position.

6. The method of claim 5, wherein the performing of a URL search comprises checking whether a domain address is present in the URL list on the basis of a first path table specifying character identification indexes according to characters constituting path address information and a second path table specifying end identification indexes according to lengths of strings serving as a path address.

7. The method of claim 6, wherein the first path table is defined to have positions corresponding to the maximum length of a path address, to enumerate, for each position, all characters usable in a path address, and to set, for each character, a character identification index as a bit pattern to indicate usage of the character, and wherein the number of bits in the character identification index corresponds to the number of entries in the URL list.

8. The method of claim 7, wherein the second path table is defined to set, for each position, an end identification index as a bit pattern to indicate a path address whose last character is placed at the position.

9. The method of claim 8, wherein the performing of a URL search comprises:
separating the URL address information into a domain address and a path address;
reversing the domain address in character sequence;
checking whether the domain address is present in the URL list according to results of AND operations between character identification indexes set in the first domain table for characters contained in the reversed domain address;
checking, when the domain address is present in the URL list, whether the length of the domain address is equal to that of a matching domain address in the URL list according to a result of AND operation between the character identification index and the end identification index set in the second domain table; and
determining, when the lengths are equal, that the domain address is present in the URL list.

10. The method of claim 9, wherein the performing of a URL search further comprises:
checking whether the path address is present in the URL list according to results of AND operations between character identification indexes set in the first path table for characters contained in the path address;
checking, when the path address is present in the URL list, whether the length of the path address is equal to that of a matching path address in the URL list according to a result of AND operation between the character identification index and the end identification index set in the second path table; and
determining, when the lengths are equal, that the URL address information contained in the connection request is present in the URL list.

11. An apparatus for Uniform Resource Locator (URL) address search, the apparatus comprising:
an interface configured to receive a connection request containing URL address information from a user over a communication network;
a memory configured to store a URL list of one or more URL addresses, a first table generated according to characters constituting URL address information in the URL list, and a second table generated according to lengths of character strings serving as URL address information in the URL list; and
a controller configured to control a URL search for checking whether the URL address information contained in the connection request is present in the URL list on the basis of the first table and the second table,
wherein the first table is used for determining whether the URL address information comprises the characters, and the second table is used for identifying the lengths of the character strings based on a position of a last character of the character strings.

12. The apparatus of claim 11, wherein the URL address information comprises a domain address and a path address.

13. The apparatus of claim 12, wherein the controller is configured to check whether a domain address is present in the URL list on the basis of a first domain table specifying character identification indexes according to characters constituting domain address information and a second domain table specifying end identification indexes according to lengths of strings serving as a domain address.

14. The apparatus of claim 13, wherein the first domain table is defined to have positions corresponding to the maximum length of a domain address, to enumerate, for each position, all characters usable in a domain address, and to set, for each character, a character identification index as a bit pattern to indicate usage of the character, and wherein the number of bits in the character identification index corresponds to the number of entries in the URL list.

15. The apparatus of claim 14, wherein the second domain table is defined to set, for each position, an end identification index as a bit pattern to indicate a domain address whose last character is placed at the position.

16. The apparatus of claim 15, wherein the control unit checks whether a domain address is present in the URL list on the basis of a first path table specifying character identification indexes according to characters constituting path address information and a second path table specifying end identification indexes according to lengths of strings serving as a path address.

17. The apparatus of claim 16, wherein the first path table is defined to have positions corresponding to the maximum length of a path address, to enumerate, for each position, all characters usable in a path address, and to set, for each character, a character identification index as a bit pattern to indicate usage of the character, and wherein the number of bits in the character identification index corresponds to the number of entries in the URL list.

18. The apparatus of claim 17, wherein the second path table is defined to set, for each position, an end identification index as a bit pattern to indicate a path address whose last character is placed at the position.

19. The apparatus of claim 18, wherein the control unit separates the URL address information into a domain address and a path address; reverses the domain address in character sequence; checks whether the domain address is present in the URL list according to results of AND operations between character identification indexes set in the first domain table for characters contained in the reversed domain address; checks, when the domain address is present in the URL list, whether the length of the domain address is equal to that of a matching domain address in the URL list according to a result of AND operation between the character identification index and the end identification index set in the second domain table; and determines, when the lengths are equal, that the domain address is present in the URL list.

20. The apparatus of claim 19, wherein the control unit checks whether the path address is present in the URL list according to results of AND operations between character identification indexes set in the first path table for characters contained in the path address; checks, when the path address is present in the URL list, whether the length of the path address is equal to that of a matching path address in the URL list according to a result of AND operation between the character identification index and the end identification index set in the second path table; and determines, when the lengths are equal, that the URL address information contained in the connection request is present in the URL list.

* * * * *